United States Patent
Ersek et al.

[11] 3,809,072
[45] May 7, 1974

[54] STERILE SHEATH APPARATUS FOR FIBER OPTIC ILLUMINATOR WITH COMPATIBLE LENS

[75] Inventors: Robert A. Ersek; Donald E. Wall; Michael C. Garity, all of Minneapolis, Minn.

[73] Assignee: Med General Inc., Minneapolis, Minn.

[22] Filed: Oct. 7, 1971

[21] Appl. No.: 187,297

[52] U.S. Cl. .................................. 128/23, 128/397
[51] Int. Cl. .......................... A61b 1/06, A61n 5/06
[58] Field of Search ............ 128/6, 16, 23, 397, 398

[56] References Cited
UNITED STATES PATENTS

| | | | |
|---|---|---|---|
| 2,768,736 | 10/1956 | Govoni | 206/16.5 |
| 2,987,960 | 6/1961 | Sheldon | 128/6 X |
| 3,132,646 | 5/1964 | Hett | 128/6 |
| 3,426,749 | 2/1969 | Jephcott | 128/11 |

FOREIGN PATENTS OR APPLICATIONS

| | | | |
|---|---|---|---|
| 885,770 | 8/1953 | Germany | 128/6 |

Primary Examiner—Channing L. Pace

[57] ABSTRACT

A sterile sheath for enclosing certain surgical illuminating lamp structures having elongated light-transmitting shafts with a light-transmitting lens means disposed at the tip end of the light-transmitting shaft. The sheath means of the present invention comprises an elongated tubular sheath having a closed end with a lens element secured to and forming a portion of the closed end, and with an opening at the other end thereof, the tubular sheath having sufficient length to cover that portion of the light-transmitting shaft having a sterile requirement. The light-transmitting lens element at the tip end is adapted to be disposed in series with a lens arranged on the light-transmitting shaft. The sheath has a pair of generally axially extending slots formed adjacent the open end to form a pair of grasping ears, with one of the axially extending slots having a length in substantial excess of the other in order to provide the grasping ears with substantial asymmetry.

7 Claims, 4 Drawing Figures

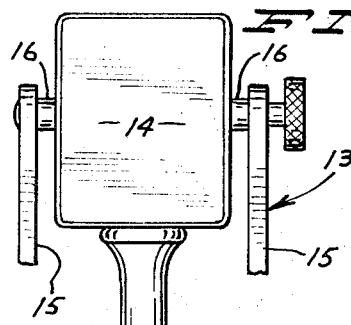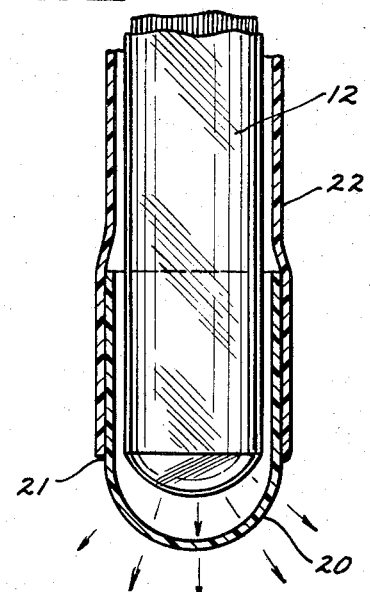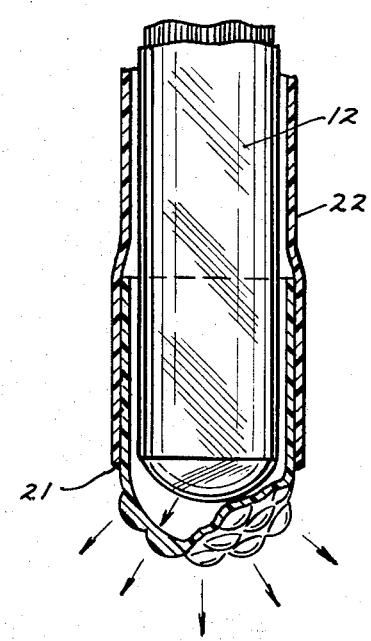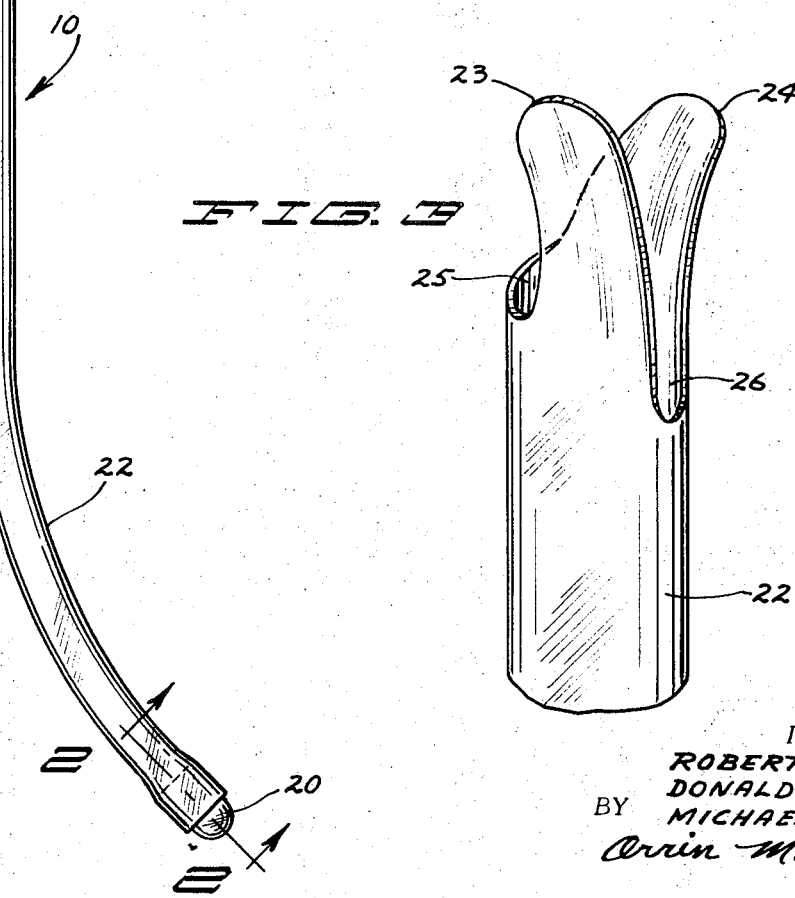

STERILE SHEATH APPARATUS FOR FIBER OPTIC ILLUMINATOR WITH COMPATIBLE LENS

CROSS-REFERENCES TO RELATED APPLICATIONS

The present invention constitutes a structure suited for use in connection with surgical illuminating apparatus of the type disclosed in my co-pending application Ser. No. 65,222, filed Aug. 19, 1970, entitled "FIBER OPTIC FOR SURGICAL LAMP," and assigned to the same assignee as the present invention. The present invention is also related to that certain invention disclosed and claimed in my co-pending application Ser. No. 187,295 entitled "STERILE SHEATH FOR SURGICAL ILLUMINATOR," executed on even date herewith, and assigned to the same assignee as the present invention.

BACKGROUND OF THE INVENTION

1. Field of the Invention

The present invention relates generally to protective sheath apparatus for surgical illuminating equipment, and more particularly to such sheaths which have integral lens closure elements and which may be used in covering certain portions of surgical illuminating devices in order to provide a sterile envelope for the illuminating device and its environment. More specifically, the invention relates to such protective sheaths which may be utilized in combination with a surgical illuminator apparatus utilizing a bundle of fiber optics to transmit light from a source to a remote lens, with the sheath apparatus being utilized to cover the portion of the fiber optic bundle which is required to be sterile and having a lens element forming the closure for the bundle. The sheath apparatus has a light-transmitting lens element secured to one end thereof to form a closed tip end. This lens element is securely fastened to the end of the tubular body portion of the sheath so as to avoid a zone which could attract contacting fluids thereto by capillarity.

2. Description of the Prior Art

Pursuant to present established medical procedures, it is normally required that all devices utilized in surgery be sterilized by either steam autoclaving, gas autoclaving, or exposure to radiation. Lighting devices which are utilized in such procedures are frequently protected by metal or plastic handles that may be easily removed, sterilized, and thereafter reattached to the lighting device. These handles are necessarily fabricated from materials which can withstand repeated exposure to the sterilizing environment. Recently, fiber optic devices, frequently referred to as "light-pipes" have been provided for use in surgical operations. These structures permit the bending of the fiber bundle at will, and these structures permit the surgeon to arrange the output of the light-pipe to direct light immediately into the operative field. One such surgical lamp structure is disclosed in the patent application entitled "FIBER OPTICS FOR SURGICAL LAMP" referred to hereinabove.

Those illuminating structures presently in widespread use normally position the light source a distance from the open wound and, therefore, when individuals attending the patient place their heads or hands in the area of the wound, the light may be blocked. This elimination of light becomes particularly critical when the surgical team is working in deep wounds or in a body cavity, such as the thorax where the entrance size is particularly limited. Since light from a proximate source is easily and heavily shadowed, access, inspection, or any other activity close to the wound area becomes extremely difficult for those individuals attending the patient. Light is easily blocked, and those in attendance may, in rely instances, ry upon only reflected light, including light which is reflected from the sides of the wound. Such lighting problems are also encountered when remote sources of light, including ceiling lights and portable spotlights are being used.

In order to permit application of the fiber optic illuminator structure to a variety of surgical procedures, sterility of the illuminator structure in proximity to any wound must be assured. The fiber optic bundle is preferably rendered sterile by enclosing or covering that portion of the bundle which is adjacent the patient. At the present time, such sterility is achieved by utilizing a detachable metal sleeve, with the sleeve covering the fiber bundle, and being positioned immediately above the wound, with the metal sleeve being subjected to sterilizing procedures before each use. As an alternative, the bundle of fibers may be subjected to sterilizing operations. Unfortunately, however, light fibers are not fabricated from materials sufficiently durable to readily withstand repeated exposure to sterilizing environments.

According to present techniques, the sterilization of the detachable metal sleeve, or of the fiber bundle is normally accomplished by unskilled personnel. The routine required for removing and replacing the fiber bundle, or the metal sleeve is also normally conducted by relatively unskilled personnel, and contamination may occur during the replacing of the structures. Modest amounts of foreign material, such as foreign protein or blood or drugs may provide a potentially lethal anaphylactic reaction during the subsequent exposure to a patient who may be allergic to such materials. Such an allergic reaction may occur even though normal sterilization operations had been employed.

According to the present invention, a flexible, disposable tubular sheath is provided which may be mass produced, sterilized, and packaged prior to use, which sheath may be secured to a surgical illuminating structure prior to use. The sheath and lens structures of the present invention are designed to cover that portion of the surgical illuminating apparatus which comprises the bundle of fiber optics, along with the bundle lens disposed at the distal end. As such, the structure covers that portion of the fiber bundle which must be sterilized for use during surgical procedures.

At the termination of each surgical procedure, the sheath apparatus of the present invention is removed from the illuminating apparatus and discarded with the structure being then ready for application of a new sheath apparatus for subsequent cases. Since each sheath is sterile when applied, the danger of cross-contamination from previous exposures is, of course, substantially eliminated.

In order to provide for ease of placement of the tubular sheath onto the fiber bundle, a pair of slots are formed along the rear open portion of the tube, with one of the slots being substantially longer than the other. Such an arrangement provides for the formation of a pair of asymmetrical grasping ears which, by virtue of their configuration, enable simple and straightforward pulling of the sheath onto the fiber bundle and its terminal lens. The tip end of the sheath is, of course, closed and sealed, with the tip end being designed to minimize any interference with the light pattern emitting from the lens. The lens portion of the structure is arranged to be disposed in series with the light-transmitting lens of the surgical illuminator. As such, the lens portion may be provided with specific contours so as to form, for example, a Fresnel-type lens or the like. Alternately, the end surface may be textured so as to disperse the wide output about a substantially wide angle.

SUMMARY OF THE INVENTION

The present invention makes it possible to utilize a convenient light source which is encased or enclosed within a sterile sheath environment. The sterile sheath structures are fabricated from materials which may be relatively quickly sterilized and packaged, and which in use, can tolerate exposure to mechanical contact with a substantial number of the devices employed during surgical operations. In addition, the sterile sheath structures are formed so as to permit easy application onto a bundle of fiber optics, with the sheath structure providing a means to enhance the light output of the lens which is normally disposed at the distal end of the fiber bundle. The sheath structure is fabricated from readily disposable materials.

Therefore, it is a primary object of the present invention to provide an improved sterile sheath structure which may be applied to the surface of a surgical illuminating apparatus employing a bundle of optical fibers.

It is yet a further object of the present invention to provide an improved sheath structure for application to a bundle of optical fibers which are utilized to transmit light from a source to a remote point, with the sheath structure being easily arranged over the surface of the bundle and readily removed therefrom, and providing a closed lens element or cap structure.

It is yet a further object of the present invention to provide a sterile sheath and lens element for covering an elongated bundle of optical fibers utilized to transmit light from a remote source to a distal tip end lens, with the sheath structure and its lens element being durable so as to tolerate exposure to casual contact with surgical instruments.

Other and further objects of the present invention will become apparent to those skilled in the art upon a study of the following specification, appended claims, and accompanying drawing.

BRIEF DESCRIPTION OF THE DRAWING

FIG. 1 is a front elevational view of the optical portion of a surgical lamp, and illustrating a light source with portions of the supporting structure removed, and with the bundle of fiber optics extending therefrom being covered by a sheath and lens element structure prepared in accordance with the present invention;

FIG. 2 is a sectional view taken along and through the diameter of the bundle of fiber optics disposed at the distal tip end of the bundle, this view being taken along the line and in the direction of the arrows 2—2 of FIG. 1;

FIG. 3 is a detail perspective view of the open end portion only of the sheath structure as shown in FIG. 1, it being apparent that FIGS. 2, 3, and 4 are each taken on a slightly enlarged scale; and FIG. 4 is a sectional view similar to FIG. 2 and showing a modified form of lens element.

DESCRIPTION OF THE PREFERRED EMBODIMENT

With particular attention being directed to FIG. 1 of the drawing, it will be observed that the sheath structure generally designated 10 is illustrated as it is applied to the fiber optic bundle 12 extending from the illuminating lamp source generally designated 13. The lamp source 13 includes a housing 14 which confines the light source per se, with the housing 14 being supported by suitable supports 15—15 coupled to trunions 16—16. Housing 14 is further provided with a ferrule means 17 which adapt and retain the bundle 12 in working relationship with the light source.

It will be appreciated that the details of construction of the illuminating device are not critical to the sheath apparatus of the present invention, however, for purposes of comprehension of the invention, one typical surgical illuminator device utilizing fiber optics is illustrated in application Ser. No. 65,222, referred to hereinabove.

With continued attention being directed to FIG. 1, and with attention also being directed to FIG. 2, it will be observed that the tip end portion 20 of the sheath structure is in the form of a generally rigid lens element sealed to the sheath along a continuous sealing line, such as is shown at 21 in FIG. 2. This seal is preferably formed by adhesive bonding or other conventional plastic sealing techniques.

The lens element 20 of the sheath apparatus is preferably formed with a generally hemispherical outer exposed tip end and a generally cylindrical shank portion. The outer diameter of the shank portion is preferably less than the inner diameter of the surrounding sheath, thus enhancing the fit and providing for a more secure and rigid structure which is free from contamination. Such a structure may tolerate fluids which are susceptible to capillary attraction between the sheath structure and these fluids which may occasionally come into contact with the sheath structure. It will be appreciated that blood would be likely to come in contact with the sheath, and capillary attraction between the blood and the sheath would, of course, be undesirable. The bond between the cylindrical shank portion of the lens element and the sheath is, of course, continuous about and adjacent the outer edge of the sheath.

The lens element of the present invention may be fabricated from any suitable material such as, for example, vinyl plastic, polystyrene, or the like. Each of these materials are, of course, commercially available in the form required.

With attention now being directed to FIG. 3 of the drawing, it will be observed that a pair of grasping ears are provided at the end of the tubular sheath portion 22, as at 23 and 24. These grasping ears are provided along either side of a pair of slots formed in the tubular structure 22, as at 25 and 26. It will be observed that these slots are of substantially different axial lengths, thereby providing grasping ears which are asymmetrical in form.

As materials of construction, it is preferred that the sheath structure be fabricated from a durable film of flexible plastic material, such as, for example, vinyl plastic tubing or the like. With a normal vinyl tubing, a wall thickness of between 3 and 6 mils is normally desired for providing the durability, rigidity, and transparency required, without adversely affecting the light output. Wall thicknesses in this range do not interfere with the mechanical handling of the fiber optic bundle.

As has been indicated, the slotted area 25 is substantially shorter in length than the slotted area 26. Normally, for most materials, the slot 25, which is the shorter of the two, will have a length substantially equal to the sheath diameter, while the longer slot will have a length equal to substantially two sheath diameters. This degree of asymmetry provides a structure which is easily pulled onto the surface of the tubular bundle of fibers, which tubular bundle is, itself, normally confined within a stationary plastic sheath.

It will be appreciated that a variety of flexible thermoplastic or thermosetting films may be employed as the material to form the tubular structure. In addition to the vinyl tubing, other flexible tubing fabricated from materials such as polyolefins, including polyethylene or polypropylene, along with a film such as tubular polyethylene terephthalate may be employed. Such materials are, of course, commercially available.

In a modified embodiment, a portion of the lens tip is rendered opaque, with a probe element arranged in extension of the tip end. Such an extension may function as a mini-probe at the tip end of the structure, if desired.

What is claimed is:

1. In a surgical illuminating lamp structure having an elongated enclosed light-transmitting shaft with a closed light-transmitting lens means disposed at the tip end of the light-transmitting shaft to form a complete enclosure, a sheath means for enclosing said lamp structure, said sheath means comprising:
   a. an elongated tubular sheath fabricated of flexible film and having a light-transmitting lens element secured to one end thereof to form a closed tip end and an opening at the other end thereof, said elongated tubular sheath having an inner diameter which exceeds the outer diameter of said light-transmitting shaft so as to be received thereover, said sheath having a substantial length to cover a substantial portion of said light-transmitting shaft during surgical procedures;
   b. said sheath lens being arranged to be disposed in series with the light-transmitting lens of said surgical illuminating lamp structure.

2. The sheath means as defined in claim 1 being particularly characterized in that said lens element has a general hemispherical outer exposed tip end and a generally cylindrical shank portion.

3. The sheath means as defined in claim 2 being particularly characterized in that the outer diameter of said shank portion is generally less than the inner diameter of said tubular sheath.

4. The sheath means as defined in claim 1 being particularly characterized in that said light transparent lens element is secured to said elongated tubular sheath by a bond extending continuously between the outer surface of said cylindrical shank portion and the inner surface of said cylindrical shank portion and the inner surface of said sheath, with said bond being disposed adjacent the outer edge of said sheath.

5. The sheath means as defined in claim 1 being particularly characterized in that said elongated tubular sheath has a pair of generally axially extending slots formed adjacent the open end thereof to form a pair of grasping ears, the first of said axially extending slots having a length in substantial excess of the other to form a pair of asymmetrical grasping ears.

6. The sheath means as defined in claim 1 being particularly characterized in that said light-transmitting lens element is provided with a plurality of lenticular elements on the surface thereof to transmit light therethrough asymmetrically.

7. The sheath means as defined in claim 1 being particularly characterized in that said generally hemispherical outer exposed tip end of said lens element is partially opaque.

* * * * *

UNITED STATES PATENT OFFICE
CERTIFICATE OF CORRECTION

Patent No. 3,809,072            Dated May 7, 1974

Inventor(s) Robert A. Ersek, et al

It is certified that error appears in the above-identified patent and that said Letters Patent are hereby corrected as shown below:

Column 2, line 8, "in rely instances, ry" should read -- in certain instances, rely --.

Signed and sealed this 10th day of September 1974.

(SEAL)
Attest:

McCOY M. GIBSON, JR.
Attesting Officer

C. MARSHALL DANN
Commissioner of Patents